United States Patent [19]

Hertzog et al.

[11] Patent Number: 5,051,581
[45] Date of Patent: Sep. 24, 1991

[54] METHOD AND APPARATUS FOR EPITHERMAL NEUTRON POROSITY WELL LOGGING

[75] Inventors: Russell C. Hertzog, Missouri City, Tex.; William A. Loomis, Ridgefield, Conn.; Peter Wraight, Missouri City, Tex.

[73] Assignee: Schlumberger Technology Corporation, New York, N.Y.

[21] Appl. No.: 517,268

[22] Filed: May 1, 1990

[51] Int. Cl.$^5$ ............................................. G01V 5/10
[52] U.S. Cl. .................................. 250/266; 250/262; 250/269
[58] Field of Search ............... 250/269, 262, 264, 265, 250/266

[56] References Cited

U.S. PATENT DOCUMENTS

| | | | |
|---|---|---|---|
| 4,097,737 | 6/1978 | Mills, Jr. | 250/269 |
| 4,152,590 | 5/1979 | Smith, Jr. et al. | 250/269 |
| 4,266,126 | 5/1981 | Mills, Jr. | 250/264 |
| 4,283,624 | 8/1981 | Mills, Jr. | 250/264 |
| 4,423,323 | 12/1983 | Ellis et al. | 250/264 |
| 4,625,110 | 11/1986 | Smith, Jr. | 250/261 |
| 4,760,252 | 7/1988 | Albats et al. | 250/269 |
| 4,910,397 | 3/1990 | Mills, Jr. et al. | 250/264 |

OTHER PUBLICATIONS

"Pulsed Neutron Porosity Logging", SPWLA 29th Annual Logging Symposium, Jun. 5–8, 1988, Mills et al.
"Pulsed Neutron Porosity Logging Based on Epithermal Neutron Die-Away", IAEA Research Coordination Mtg., Ottawa, Canada, Nov. 2–6, 1987, Mills et al.

Primary Examiner—Carolyn E. Fields
Attorney, Agent, or Firm—Richard G. Berkley; Leonard W. Pojunas

[57] ABSTRACT

The porosities of subsurface earth formations surrounding a borehole are investigated using a logging tool run in the wellbore by repeatedly irradiating the formations with discrete bursts of high energy neutrons, measuring the populations of epithermal neutrons at near and far locations from the neutron source, and also measuring the rate of decay of the epithermal neutron population at a third location following each neutron burst and deriving therefrom a measurement of the epithermal neutron slowing down time. Formation porosity values derived from the near-and-far location population measurements are corrected for detector standoff effects by use, in accordance with a predetermined empirical relationship, of the epithermal slow down time measurement. Alternatively, formation porosities may be derived both from the near-and-far location measurements and from the epithermal slowing down time measurement, and the two differently-derived porosity values may be used independently to provide enhanced information of formation porosity or they may be compared to derive a standoff-corrected porosity value.

18 Claims, 6 Drawing Sheets

METHOD AND APPARATUS FOR EPITHERMAL NEUTRON POROSITY WELL LOGGING

DESCRIPTION

1. Field of the Invention

The present invention relates generally to epithermal neutron well logging and, more particularly, to a method and an apparatus for determining the porosities of subsurface earth formations based on measurements of both the slowing down lengths and slowing down times of epithermal neutrons with minimal effects of the borehole environment.

2. Background of the Invention

Knowledge of the porosities of earth formations surrounding a wellbore is important in the petroleum industry to assist in identifying oil-and-gas-bearing zones. Epithermal neutron porosity logging makes use of the facts that hydrogen strongly affects neutron moderation and that the pore spaces of earth formations are usually filled with hydrogen-rich fluids, namely hydrocarbons or water. In one form of epithermal neutron porosity logging, the borehole and formation are irradiated with neutrons from a chemical or accelerator source, and the populations of epithermal neutrons are detected at one or more locations some distance or distances from the neutron source. The detected counts are correlatable with porosity either individually or as ratios of counts. In this type of neutron logging, the detected count rates and count rate ratios are functions of the slowing down lengths of epithermal neutrons in the irradiated formations. In another form of epithermal neutron logging, the borehole and formation are irradiated with discrete short bursts of neutrons from an accelerator source, and the time rate of decay (slowing down time) of epithermal neutrons is determined by measuring the die-away or decay of epithermal neutrons as a function of time (as counts in multiple channels). Again, there is a correlation between the epithermal neutron slowing down time and formation porosity.

With both types of logging, the count rate data are affected in various, though different, ways by borehole environmental conditions, borehole size, tool standoff, formation fluids, mudcake thickness and composition, and formation lithology. As between slowing down length measurements and slowing down time measurements, slowing down length-derived porosity measurements are less affected by borehole environment and tool standoff than slowing down time-derived measurements. Slowing down length measurements, on the other hand, are more strongly affected by formation lithology than are slowing down time-derived porosity measurements. Also, the usual slowing down length measurement technique uses far-spaced detector and near-spaced detector count rates, whereas a slowing down time measurement technique uses relatively close spacing of the detector (or detectors) to the source in order to obtain statistically meaningful count rates in each time interval. Slowing down length measurements of porosity provide a greater depth of investigation into the formation than do slowing down time measurements of porosity. More generally, it is sufficient to say that both types of measurements of epithermal neutrons provide qualitatively different knowledge of formation porosities and are affected differently by formation lithology and borehole size and environment.

Methods and apparatus for epithermal neutron porosity logging are described and shown in several prior publications and patents.

In the technique of U.S. Pat. No. 4,023,323 (Ellis et al., Dec. 27, 1983), epithermal neutrons are detected by near-spaced and far-spaced detectors (slowing down length measurements). The ratios of near and far counts are correlated with empirically predetermined responses that take into account variations in borehole size or tool standoff, thus yielding porosity values compensated for the effects of borehole size or standoff.

U.S Pat. No. 4,760,252 (Albats et al., July 26, 1988) describes neutron porosity logging tools having a pulsed neutron source, near and far epithermal neutron detectors that are specially shielded and located on the sonde to optimize response to formation porosity and minimize the near/far ratio response to borehole environmental effects, and a neutron source monitor that enables normalization of count data and measurement of capture gamma rays. Formation porosity values are derived by taking the ratio of the near-and-far epithermal neutron counts or by cross-plotting the normalized near-and-far counts directly.

Investigations of formation porosities by measurements of epithermal neutron slowing down times are described in the Mills et al. paper "Pulsed Neutron Porosity Logging", SPWLA Twenty-fifth Annual Logging Symposium, June 5–8, 1988, and in U.S. Pat. Nos. 4,097,737 (Mills, Jr., June 27, 1978), No. 4,266,126 (Mills, Jr., May 5, 1981), No. 4,283,624 (Mills, Jr., Aug. 11, 1981), and No. 4,625,110 (Smith, Jr., Nov. 25, 1986). These publications and patents evidence the known sensitivity of epithermal slowing down time measurements to formation porosity and the relatively insensitivity thereof to formation lithology. They do not, however, adequately address or compensate for the significant effect of tool standoff on epithermal slowing down time measurements.

SUMMARY OF THE INVENTION

One objective of the present invention is to investigate formation porosity by epithermal neutron logging in a manner that provides a greater range of neutron scattering data than is attained by separate slowing down time measurements or slowing down length measurements. Another objective is to detect epithermal neutron populations in a manner that enables derivation of formation porosities that are inherently corrected for the effects of tool standoff. Still another object of the inventions is to provide slowing down length-based porosity measurements which have been corrected for tool standoff effects. Still a further objective is to provide simultaneous epithermal neutron slowing down length measurements and epithermal neutron slowing down time measurements, which may then be processed separately or in combination to provide enhanced and more reliable information of formation porosities.

These and other objectives are attained, according to the present invention, by passing a neutron logging tool through the borehole while repeatedly irradiating the borehole and earth formations with discrete bursts of high energy neutrons from a neutron source, which neutrons interact with nuclei of the materials in the borehole and the formations to produce populations of epithermal neutrons. The populations of epithermal neutrons are detected at near and far locations in the borehole spaced apart longitudinally from the neutron source by different distances, and count signals indicative of such epithermal neutron populations at the respective near and far locations are generated. The time distribution of epithermal neutrons following each neutron burst is also detected, either at one of the near-far locations or, preferably, at a third location from the neutron source, and signals indicative of the slowing down time of the epithermal neutron population are generated. The near-far epithermal neutron population measurements and the epithermal neutron slowing down time measurements may be processed separately to derive independent values of formation porosity, or they may be combined, in accordance with predetermined empirical relationships, to provide standoff-compensated porosity values. The latter step may be carried out, for example, by cross plotting the ratio of the near-far epithermal neutron population measurements against the epithermal slowing down time or, alternatively, the independently derived values of formation porosity may be crossplotted to obtain a correction factor to be applied to the slowing down length (near-far ratio)-derived porosity value to compensate for standoff.

The simultaneous measurements of both the number and the time evolution of epithermal neutrons provides porosity measurements more powerful than either measurement alone provides. For example, the near-far ratio derived porosity is relatively sensitive to formation lithology and relatively less sensitive, but not wholly insensitive, to tool standoff. The slowing-down-time derived porosity, on the other hand, is very sensitive to tool standoff effects and relatively insensitive to formation lithology. By combining the near-far ratio measurement and the slowing down time measurement (or the independent porosity values derived therefrom), the present invention results in ratio-derived porosity values that are standoff corrected. Also, the two measurements have different depths of investigation, and making both of them improves the measurement of overall vertical and radial porosity variations.

For a better understanding of the invention reference may be made to the following description of exemplary embodiments taken in conjunction with the accompanying drawings.

DESCRIPTION OF PREFERRED EMBODIMENTS

Figure 1:
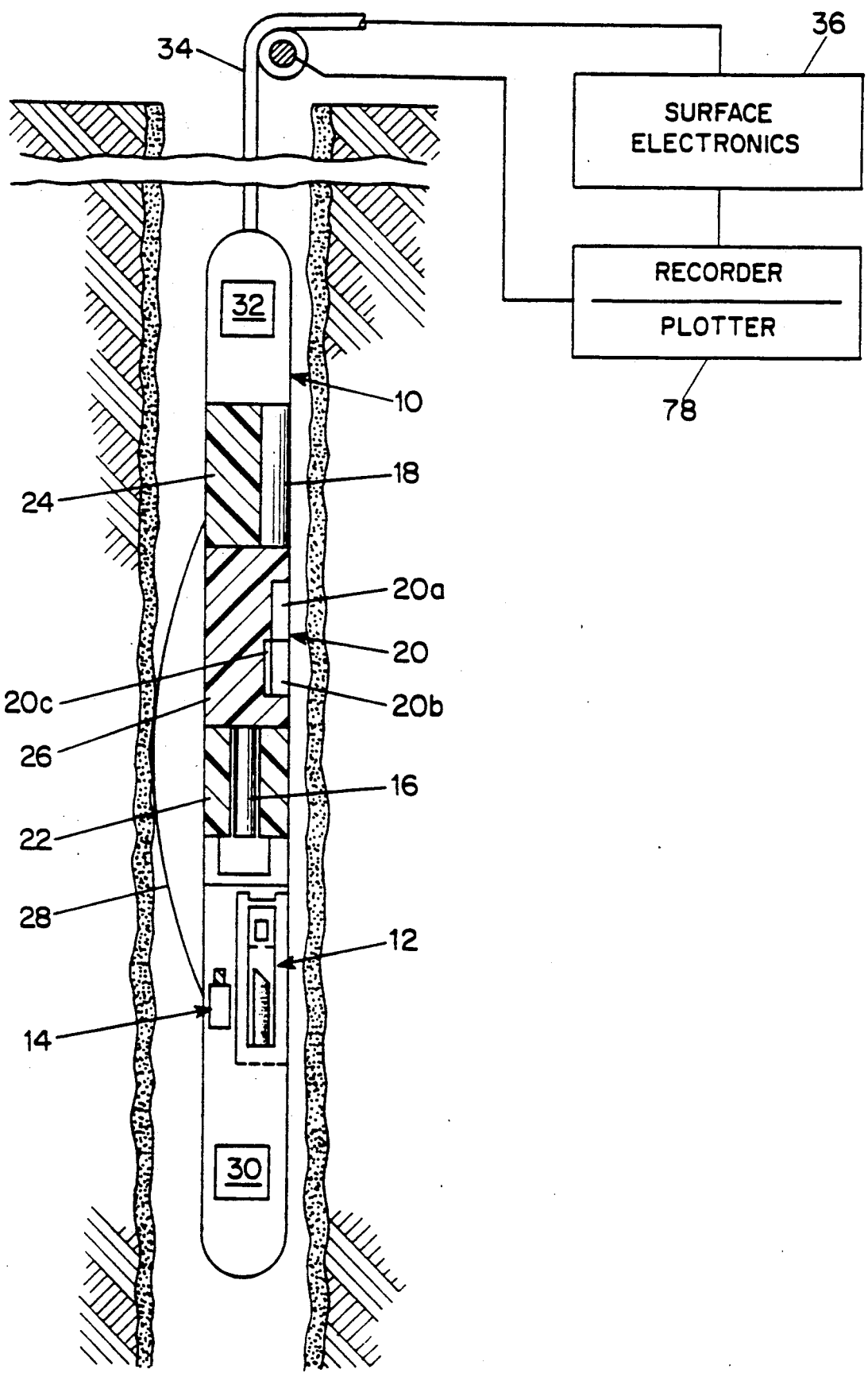
FIG. 1 is a generally schematic side cross-sectional view of a well-logging tool embodying the invention, the tool being shown in a borehole.

Epithermal neutron porosity logging, according to the present invention, can be carried out using a logging tool similar in most respects to those described and shown in U.S. Pat. No. 4,760,252 (Albats et al., July 26, 1988), which is hereby incorporated herein by reference, or any similar tool. As shown in FIG. 1, an embodiment of the tool (or sonde) 10 includes an accelerator neutron source 12, such as a D-T type (14 MeV) source having an output of the order of $5 \times 10^8$ n/sec or greater, a neutron source monitor 14, a near epithermal neutron detector 16, a far epithermal neutron detector 18, and an array 20 of two (or more) epithermal neutron detectors 20a and 20b. If desired, one or more thermal neutron detectors 20c may also be included in the detector array 20. It will be appreciated that, while preferred, not all of the detectors or the neutron monitor are required. It is necessary only that at least two differently-spaced epithermal neutron detectors be provided to generate the near/far count ratio, one or both of which detectors could then also be used to generate the slowing down time measurement. As described hereinafter, however, the combination of a near/far count rate ratio measurement from the detectors 16 and 18 and a slowing down time measurement from one (or more) of the epithermal array detectors 20a, 20b is of particular advantage in optimizing count rate statistics and sensitivity to formation porosity.

The near detector 16 is centralized within the sonde and surrounded by an annular neutron shield 22, while the far detector 18 and the array 20 are eccentered within the sonde and are back-shielded by neutron shields 24 and 26, respectively. The positioning and the shielding of the far detector 18 and the array 20 are such as to provide high sensitivities to neutrons scattered from the formation by excluding as much as possible neutrons scattered from the borehole. The near detector 16, on the other hand, is located near the neutron source 12, is centralized within the sonde, and is shielded to desensitize it to formation neutrons and sensitize it to borehole neutrons. (The structural and functional characteristics of the detectors and shielding are described in more detail in the abovereferenced Albats et al. U.S. Pat. No. 4,760,252. For present purposes, it is sufficient to note that the epithermal detectors 16, 18 and 20 are of the He-3 proportional counter type shielded against thermal neutrons, and the low energy detection threshold of the near detector 16 is raised by the external shield 22 to at least approximately 10 eV.) Accordingly, the ratio of the near to the far epithermal neutron counts is inherently more sensitive to the far counts and thus porosity, while the sensitivity of the near detector to borehole neutrons affords information useful in compensating the near to far count ratios for environmental effects and tool standoff. As shown in FIG. 1, the sonde 10 is run eccentrically in the borehole, being held in contact with the borehole wall by a bowspring 28 or other suitable means.

The sonde 10 has a power supply 30 and a downhole electronics package 32 and is run in the borehole suspended by a cable 34 that includes conductors to provide electrical power to the sonde power supply 30 and to transmit data from the downhole electronics package 32 to the surface electronics 36. Although the order of the source 12, near detector 16, detector array 20 and the far detector 18 is shown in FIG. 1 as from bottom to top of the sonde 10, the order may be reversed if desired.

Figure 2:
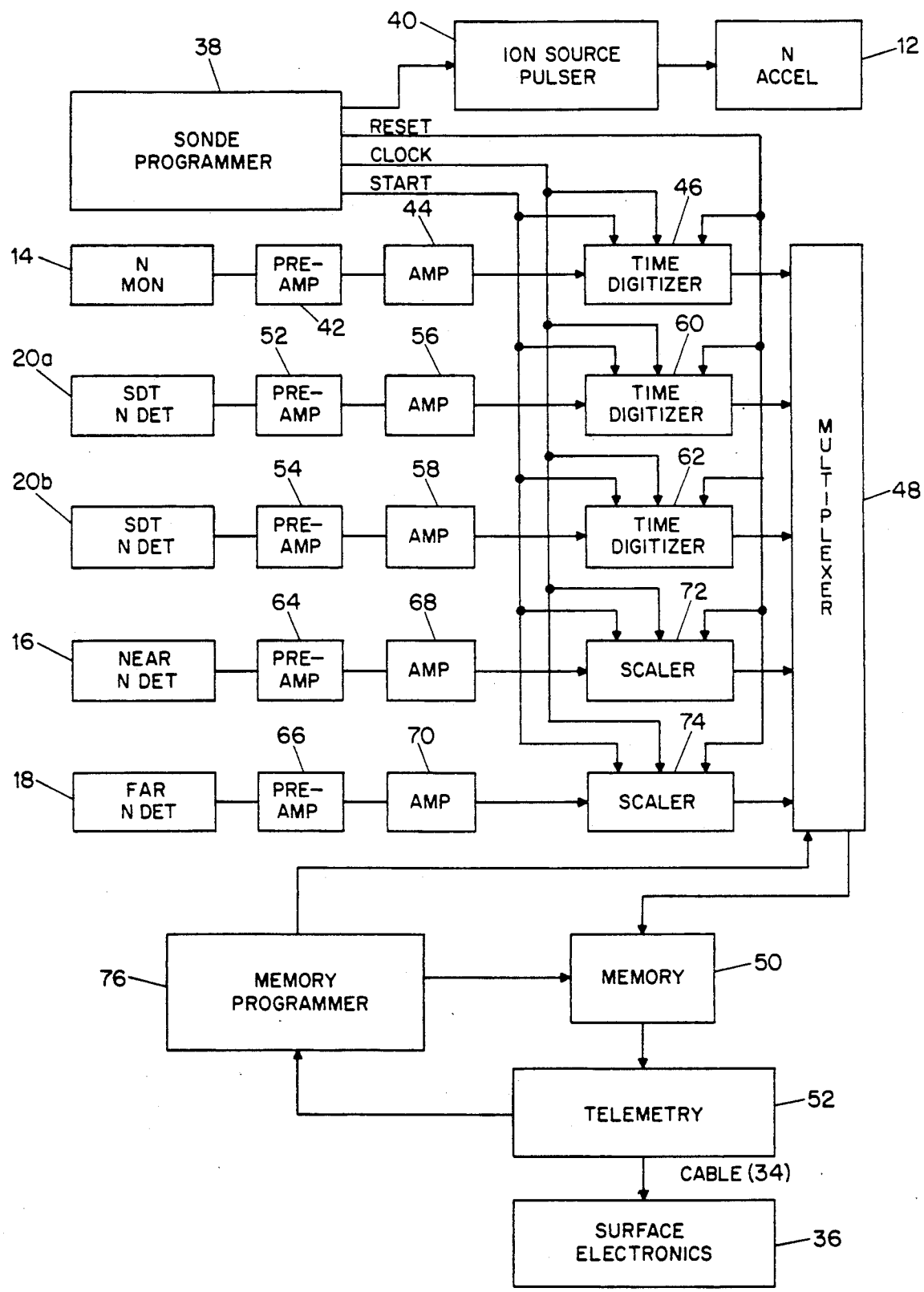
FIG. 2 is a schematic diagram of the control and signal processing circuitry of the logging tool.

Referring to FIG. 2, each neutron burst is initiated by a signal from a sonde programmer 38 to an ion source pulser 40. The burst timing regime may be selected as desired, but preferably is of the order of 20 microsecond burst width at 100 microsecond intervals. The output signals of the neutron source monitor 14, if used, are applied to a pre-amp 42, amplifier 44 and time digitizer 46 for production of a neutron burst histogram (neutron source output versus time curve) for use, if desired, in normalizing detector counts, deriving thermal neutron capture data, and defining a fiducial time window for processing the pithermal die-away curve data. Further information concerning the source monitor 14 and its use are set out in the aforementioned U.S. Pat. No. 4,760,252. The time digitizer 46 is armed by a START pulse from the programmer 38, which is synchronized with the ion source pulse and occurs slightly before the neutron burst. CLOCK pulses from the programmer determine the widths of the time channels, and the input pulses from the amplifier 44 stop the CLOCK pulse counters in the digitizer 46 to digitize the time intervals from the START pulse to the input pulses. At the end of the desired data measurement interval, the digitizer 46 is reset to zero and the counts per channel data are read out by a RESET pulse from the programmer 38 to a multiplexer 48 and applied (along with detector signals) to a digital read-write memory 50.

The signals from each of the slowing down time epithermal neutron detectors 20a and 20b are amplified (pre-amps and amps 52, 54, 56 and 58), applied in response to CLOCK signals to time digitizers 60 and 62, and stored in the memory 50 by channels. The signals from the near and far epithermal neutron detectors 16 and 18, after processing in pre-amps 64 and 66 and amplifiers 68 and 70, are applied to scalers 68 and 70 where they are accumulated for a predetermined time interval, e.g. on the order of several seconds. RESET signals apply the total counts of the near and far detectors to the memory 50. The multiplexing and memorizing of count data are controlled by a memory programmer 76, which also controls the periodic destructive readout of the data from the memory 50 through telemetry 52 to the surface electronics 36 over the sonde cable 34.

Figure 3:
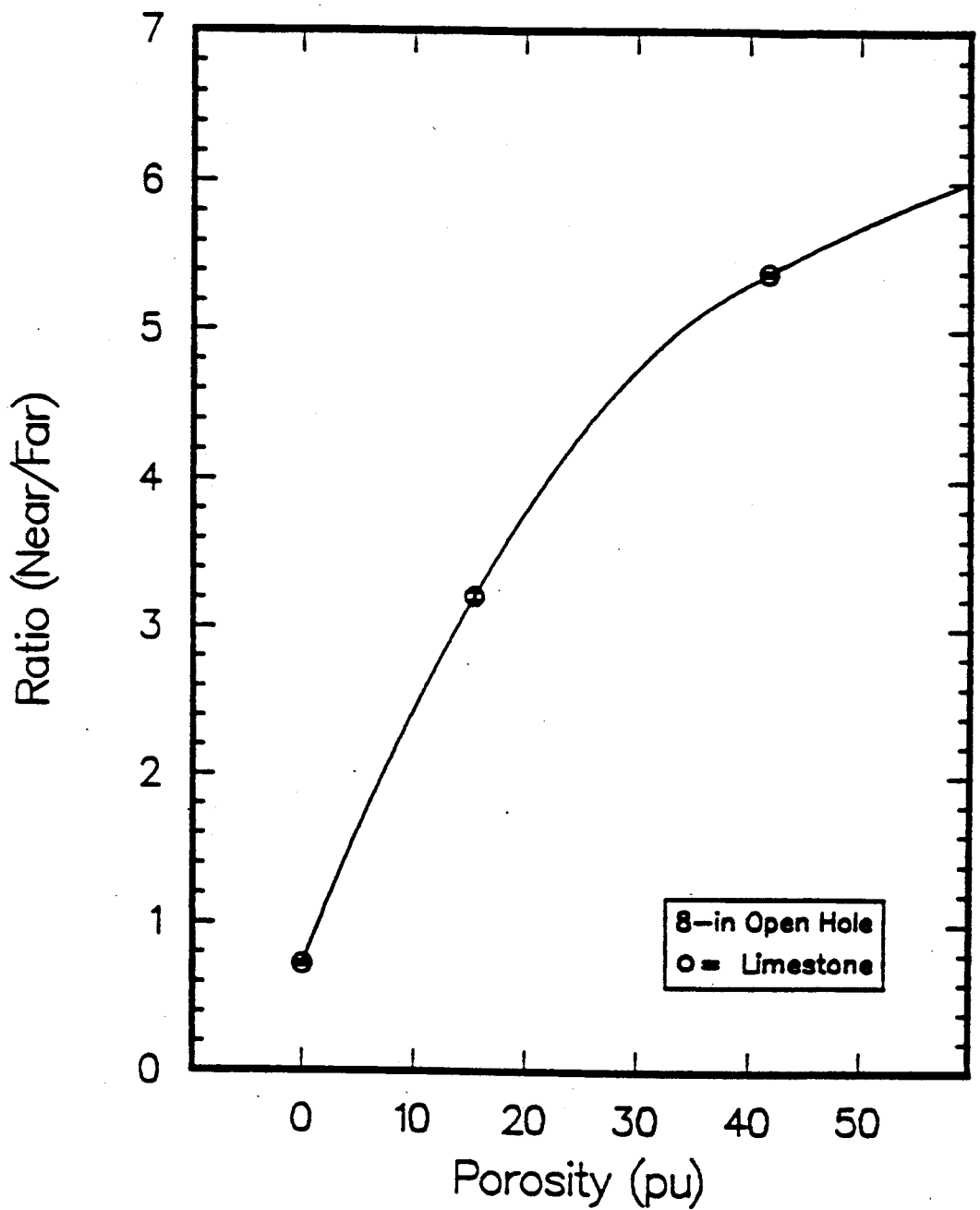
FIG. 3 is a plot of the near/far epithermal neutron count ratio versus formation porosity.

As is well known cer se (see also the Albats et al. '252 patent referred to above), the ratio of the epithermal neutron population counted by the near detector 16 to the epithermal neutron population counted by the far detector 18 correlates with formation porosity. The correlation varies with formation lithology and borehole size. It is also sensitive to the tool standoff that results from either riding of the tool on a mudcake or local irregularities in the borehole wall or both. As described in the Albats et al. U.S. Pat. No. 4,760,252, different lithologies and borehole sizes are taken into account by using different empirically predetermined correlation data and known or likely lithology and borehole size in the formation under investigation to compute and plot formation porosity on the well log plotter/recorder 74 (FIG. 1). A typical correlation is shown in FIG. 3.

The design of the sonde—shielding and location of detectors 16 and 18—is such that standoff is compensated to some extent in the near/far count ratio itself. Nonetheless, the tool response to standoff affects the measured count data, and the tool standoff effect is not always fully taken into account in presently available correlation procedures upon which the computations of formation porosities from the near/far count ratios are made.

Figure 4:
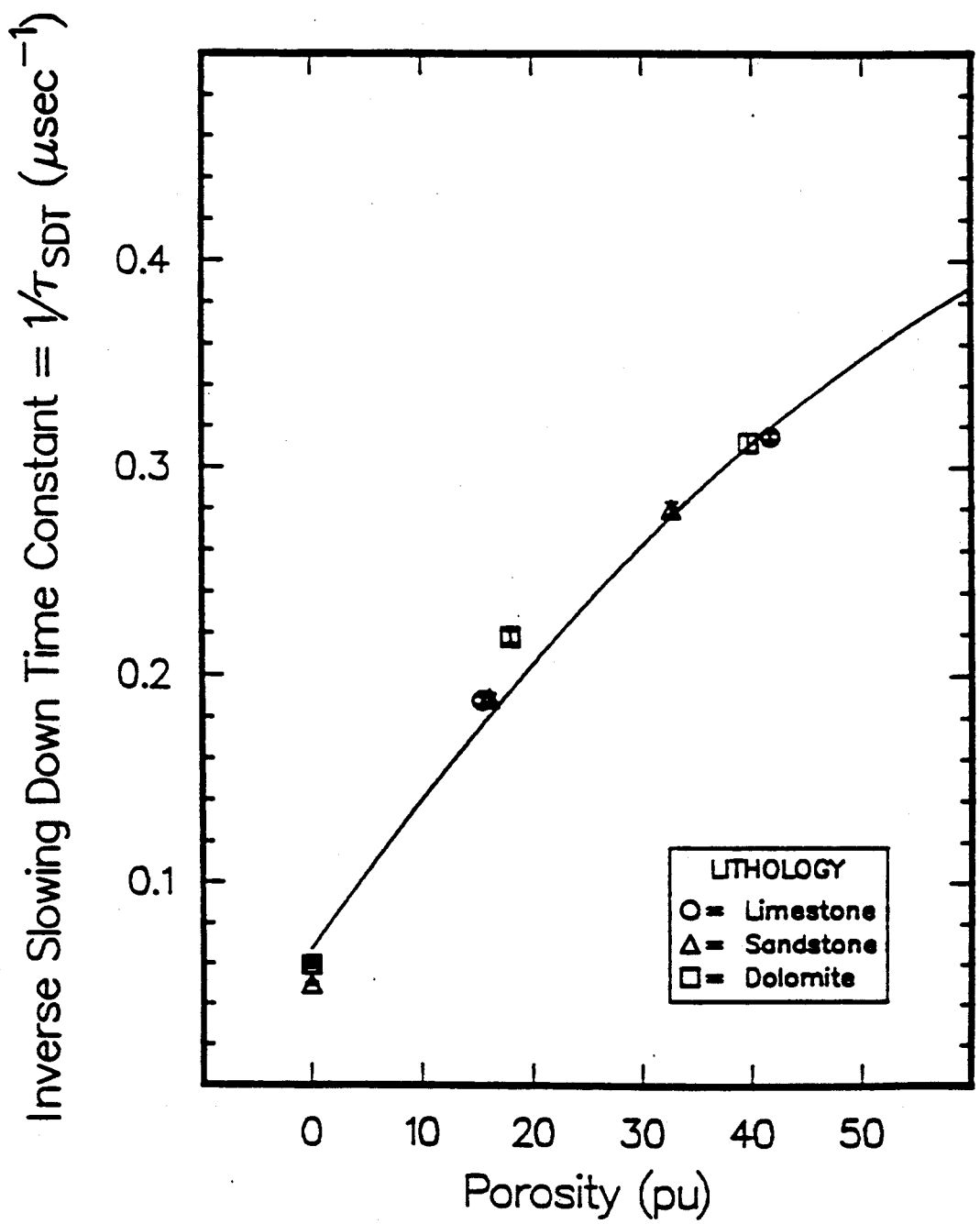
FIG. 4 is a plot of the inverse of the epithermal neutron slowing down time constant versus formation porosity.

The epithermal neutron count data from either or both of the detectors 20a and 20b, which may be used separately or combined, will show a decay curve which reflects both the formation epithermal neutron slowing down time ($\tau$) and the slowing down time effect of standoff. The neutron count data can be processed in various ways that are well-known to obtain a single time parameter that responds to both formation porosity and the amount of standoff. The count data may, for example, be processed to fit the decay curve to a single-component time decay function such as a single exponential function or, preferably, a single-component diffusion function, as described in commonly-owned U.S. Pat. No. 4,947,040 filed Dec. 20, 1989, for "Thermal Decay Time Logging Method and Tool", incorporated herein by reference. The single epithermal slowing down time value obtained by one of these methods may be converted, by use of predetermined correlation curves such as that of FIG. 4, to provide a measurement of formation porosity. FIG. 4 shows a representative crossplot of the inverse slowing down time constant $\tau$ determined from laboratory, test pit or test well measurements versus porosity at 0 inch standoff. FIG. 4 resulted in a correlation of the slowing down time constant computed from the measured decay rates to be largely independent of formation lithology. Alternatively, with data of high statistical precision, the decay curve may be fitted so that both the formation slowing down time and a parameter indicative of standoff may be extracted. Such a technique is described in detail in the commonly-owned U.S. Pat. No. 4,972,082, filed Mar. 16, 1989, for "Methods and Apparatus for Epithermal Neutron Logging". There are thus several ways to obtain parameters, such as $\tau$, that are indicative of porosity, standoff, or both, from epithermal neutron decay curves It is an advantage of the present invention, however, that a value of $\tau$ which is responsive to (or influenced by) both the formation and standoff can be used in order to provide standoff compensation of the near-far ratio derived porosity measurement.

In accordance with the present invention, formation porosities substantially free of the effects of tool standoff are determined from simultaneous measurements of total epithermal neutron populations at two spaced locations and of the rate of decay of epithermal neutron populations at least at one location. The ratio of the total counts (or a crossplot of such counts) at the near and far locations is a function of the slowing down length of scattered epithermal neutrons, and the measurement of the rate of decay of the scattered epithermal neutrons following each neutron burst is indicative of slowing down time. As mentioned above, those two forms of measurement investigate somewhat different aspects of the environments (both borehole and formation environments) irradiated by the neutron burst. By measuring them both simultaneously and using both to determine formation porosity, more powerful data are available, and more accurate correlations of the measurements with true formation porosities are attainable.

Figure 5:
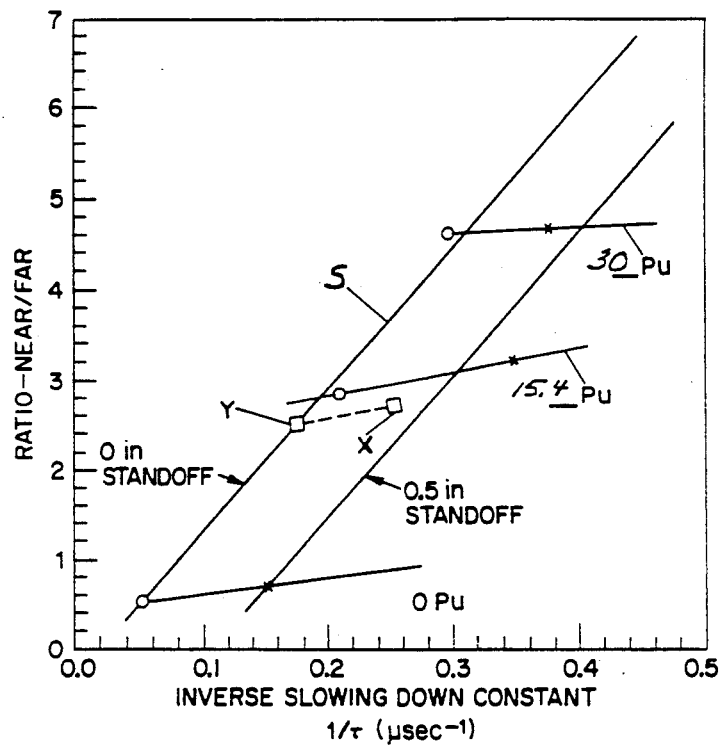
FIG. 5 is a chart of empirically predetermined responses of the tool to various formation porosities and standoffs resolved as a "spine and ribs" plot of the near/far count ratio versus the inverse of the slowing down time constant for different standoffs and formation porosities.

As in most known porosity logging techniques, the present invention involves correlation of data obtained from the logging run with empirically predetermined tool responses to known conditions in test pits and test wells. In one form of correlation, which is depicted in FIG. 5, count data are determined with the tool at known standoffs, porosities and lithology, and the measured near/far count ratios as derived from the detectors 16 and 18 are cross-plotted against the inverse slowing down time calculated by fitting the count data from the slowing down time detector 20a to a single exponential function or some other suitable fitting function. (The measurements from only one detector of the array 20 were used in the data of FIG. 5, but it will be understood that measurements from two or more detectors can be used separately or in selected combinations.) Also, where count rate statistics are adequate, the time-dependent count data used in deriving $\tau$ can be developed from the far epithermal detector 18 if desired. The use of the near-spaced detector 16 and the far-spaced detector 18 to generate the near/far count ratio measurement and an intermediately-spaced detector or detectors 20a, 20b to generate the slowing down time measurement is preferred, however, as it optimizes the sensitivity of both the near/far ratio and the slowing down time measurements to formation porosity commensurate with acceptable count rate statistics. The crossplot of FIG. 5 will be recognized as a "spine and ribs" chart, the spine being the line "S" of measurements at 0 standoff and the ribs being the 0, 15.4 and 30 p.u. porosity lines. The data crossplotted in FIG. 5 were obtained by logging a test well of known formation porosity and lithology. One logging pass was made at 0 standoff and a second pass at forced 0.5-inch (12.7 mm) standoff. The test well was substantially free of mudcake.

The spine and ribs plot enables corrections to be made for unknown tool standoffs of near/far ratios and slowing down times measured in a wellbore of the same size in formations of similar lithology. For any given measured data there is a data point on the crossplot, for example, measured data point X. The correction is made by transfer of the data point in the rib direction across to the 0 standoff line (the spine) by interpolation along the spine between ribs to yield the porosity value at the point marked Y in FIG. 5.

As will be understood by those skilled in the art, a collection of crossplots for use in boreholes of various sizes and with various lithologies is determined empirically and stored as programs in the surface computer to enable the corrected porosity values to be plotted as a function of depth as the tool is being run. The count data are also routinely recorded for further processing, if desired. A recorder/plotter 74, suitably coupled to a cable-follower mechanism, is provided for these purposes, as is conventional in the art.

Figure 6A:
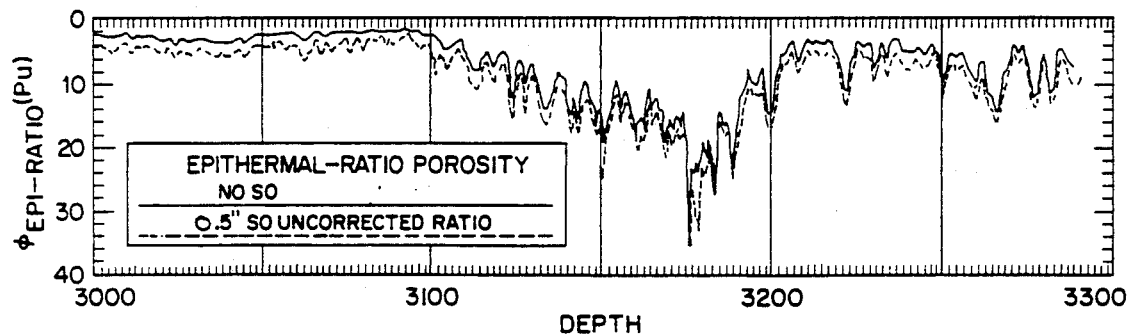
FIGS. 6 and 6B are compilations of neutron porosity well logs run using a tool of FIG. 1.
Figure 6B:
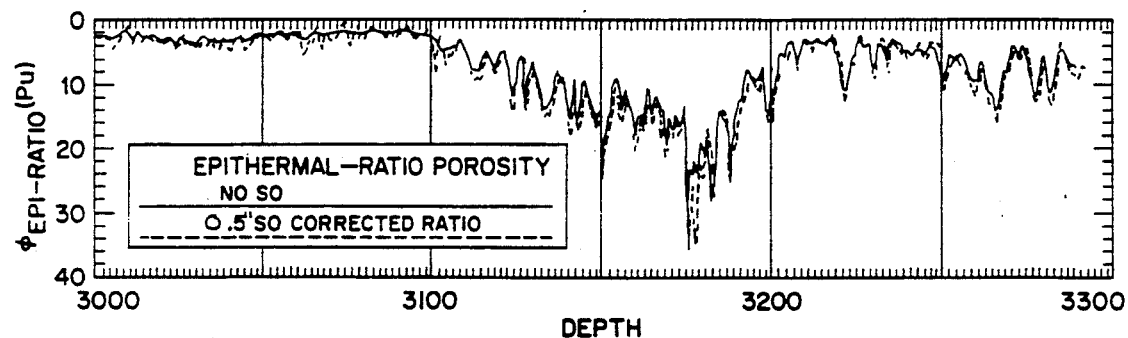

Logs of two runs ("passes") of the tool in the test well are shown in FIG. 6A, the solid-line curve representing the observed porosity at 0 standoff and the broken-line curve representing the observed porosity at fixed 0.5 in. (12.7 mm) standoff. Both logs plot the formation porosities in porosity units (p.u.) determined from predetermined empirical correlations of the near/far count ratios of epithermal neutrons to porosity, as shown for example in FIG. 3. The effect of standoff on the ratio-based porosity log at the known 0.5 in (12.7 mm) standoff is clearly apparent. FIG. 6B shows the same 0 standoff log (solid-line curve) as in FIG. 6A, but shows the 0.5 in. (12.7 mm) standoff log (broken-line curve) after correction for standoff based on the near/far ratio v. 1/$\tau$ crossplot of FIG. 5. The corrected log of FIG. 6B very closely follows the measured log at 0 standoff, thus demonstrating the validity of using measurements of epithermal neutron slowing down times to correct ratio-derived porosity values for unknown standoff.

The relatively small slopes of the porosity ribs in FIG. 5 indicate that the ratio of the measured epithermal neutron populations is not as greatly affected by tool standoff as are measurements of the slowing down time. Accordingly, the present invention provides a method for using the large sensitivity of slowing down time measurements to tool standoff to make an appropriate and significant simultaneous correction to the measured epithermal neutron ratio.

Because tool standoff strongly affects measurements of slowing down times, the validity of corrected porosity values obtained using the present method is considerably reduced when tool standoff exceeds about 1 inch (25.4 mm) of borehole water or about 2 inch (50.8 mm) of mudcake. It is already known that porosities based on measurements of epithermal neutron slowing down times alone are of questionable validity under such standoff conditions.

Figure 7:
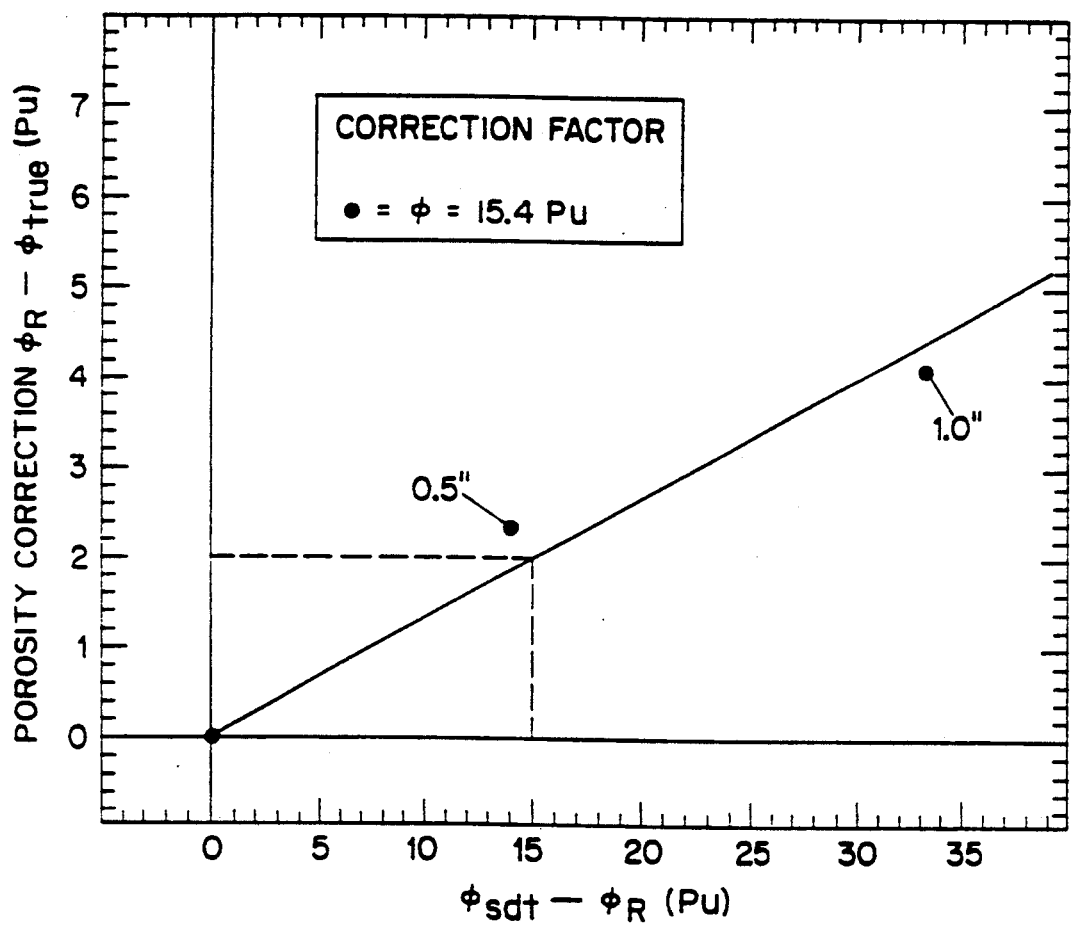
FIG. 7 is a crossplot of the differences between porosities determined empirically from the near/far count ratio and the slowing down time constant at known porosities and standoffs versus the correction required in the ratio porosity to correct for tool standoff.

In the crossplot of FIG. 5, the ribs representing porosities (0, 15.4 and 30 p.u.) were established from empirical measurements of tool responses (detected near/far count ratios R and slowing down time constant $\tau$) under known borehole and formation conditions, thereby affording standoff-compensated porosity measurements based directly on measured values of the near/far count ratio and the epithermal slowing down time constant $\tau$. Another way of compensating for the effects of standoff on the observed porosity is to derive a crossplot of the type shown in FIG. 7, which yields a correction factor $\Delta\phi_R$ to be subtracted from the observed near/far ratio-derived porosity to obtain the true porosity. In FIG. 7, the difference between the slowing down time-derived porosity $\phi_{sdt}$ (e.g., from FIG. 4) and the near/far ratio-derived porosity $\phi_R$ (e.g., from FIG. 3) is plotted against the correction factor $\Delta\phi$ for a formation porosity of 15.4 p.u. and two different standoffs (0.5 in. (12.7 mm) and 1 in. (25.4 mm)). The crossplot of FIG. 7 is easily programmed for use with the uncorrected values of $\phi_{sdt}$ and $\phi_R$ derived from the measured values of the near/far ratio and $\tau$ to correct the measured $\phi_R$ values for standoff and, thereby, obtain true porosities. For example, if the count data result in computed values of $\phi_{sdt}$ and $\phi_R$ of 30 p.u. and 15 p.u., respectively, the corrected value (from FIG. 7) of $\phi_R$ is 15 p.u. minus 2 p.u.=13 p.u.

Although the invention has been described above with respect to specific embodiments, it will be apparent to those skilled in the art that various modifications and variations of the invention may be made without departing from the inventive concepts. All such modifications and variations are intended to be included within the spirit and scope of the appended claims.

We claim:

1. A method for investigating the porosity of a subsurface earth formation surrounding a borehole comprising:

repetitively irradiating the borehole and earth formation with discrete bursts of high energy neutrons from a neutron source, which neutrons interact with nuclei of the materials in the borehole and the formation to produce therein populations of epithermal neutrons;

detecting the populations of epithermal neutrons at near and far locations in the borehole spaced apart longitudinally by different distances from the neutron source;

generating count signals indicative of the magnitudes of the detected epithermal neutron populations at the respective near and far locations;

detecting the decay of the epithermal neutron populations following the neutron bursts at least at one location in the borehole and generating signals representative thereof;

deriving from said decay signals a signal indicative of the slowing down time of epithermal neutrons in the formation at said at least one location; and deriving from the near and far count signals and the slowing down time signal a measurement signal representative of the porosity of the formation surrounding the borehole inherently compensated for the effects of tool standoff on the responses of the logging tool.

2. A method according to claim 1 wherein said porosity measurement deriving step comprises combining, according to a predetermined relationship, a signal representative of a ratio of the near and far location count signals and the epithermal slowing down time signal to derive said standoff-compensated measurement signal of the formation porosity.

3. A method according to claim 1 wherein said porosity-measurement deriving step comprises:

deriving from said near and far count signals a first measurement signal representative of formation porosity and from said epithermal slowing down time signal a second measurement signal representative of formation porosity; and combining said first and second porosity measurement signals according to a predetermined relationship to derive a correction factor signal indicative of the effect of tool standoff on said first porosity measurement signal.

4. A method according to claim 3 wherein said porosity measurement deriving step further comprises combining said correction factor signal with said first porosity measurement signal to derive said standoff-compensated porosity measurement signal.

5. A method for investigating the porosity of a subsurface formation surrounding a borehole, comprising:

repetitively irradiating the well borehole and surrounding earth formation with bursts of high energy neutrons from a neutron source, which neutrons interact with nuclei of the materials in the borehole and the formation to produce therein populations of epithermal neutrons;

measuring the magnitude of the epithermal neutron populations at least at two locations spaced at different distances along the borehole from the neutron source and generating respective count signals representative thereof;

measuring the decay of the epithermal neutron population between bursts at least ar one location along the borehole and generating signals representative thereof;

deriving from said at least two epithermal neutron population count signals a first measurement of formation porosity as a function of the slowing down length of epithermal neutrons in the earth formation;

deriving from said epithermal neutron population decay signals a second measurement of formation porosity as a function of the slowing down time of epithermal neutrons in the earth formation; and combining said first and second porosity measurements to derive a standoff-compensated measurement of formation porosity.

6. A method according to claim 5 wherein said first porosity measurement is derived by forming a ratio of said at least two epithermal neutron population count signals and deriving a signal representative thereof; and converting said ratio signal according to a predetermined relationship to derive said first porosity measurement.

7. A method according to claim 5 wherein said second porosity measurement is derived by:

deriving from said epithermal neutron population decay signals a measurement of the epithermal neutron slowing down time of the earth formation and generating a signal representative thereof; and converting said epithermal slowing down time measurement signal according to a predetermined relationship to derive said second porosity measurement.

8. Apparatus for investigating the porosity of a subsurface earth formation surrounding a borehole comprising means for repetitively irradiating the borehole and earth formation with discrete bursts of high energy neutrons from a neutron source, which neutrons interact with nuclei of the materials in the borehole and the formation to produce therein populations of epithermal neutrons;

means for detecting the populations of epithermal neutrons at near and far locations in the borehole spaced apart longitudinally by different distances from the neutron source;

means for generating count signals indicative of the magnitudes of the detected epithermal neutron populations at the respective near and far locations;

means for detecting the decay of the epithermal neutron populations following the neutron bursts at least at one location in the borehole and generating signals representative thereof;

means for deriving from said decay signals a signal indicative of the slowing down time of epithermal neutrons in the formation at said at least one location; and means for deriving from the near and far count signals and the slowing down time signal a measurement signal representative of the porosity of the formation surrounding the borehole compensated for the effects of tool standoff on the responses of the logging tool.

9. Apparatus according to claim 8 wherein said porosity-measurement deriving means comprises means for combining, according to a predetermined relationship, a signal representative of a ratio of the near and far location count signals and the epithermal slowing down time signal to derive said standoff-compensated measurement signal of the formation porosity.

10. Apparatus according to claim 8 wherein said porosity-measurement deriving means comprises:

means for deriving from said near and far count signals a first measurement signal representative of formation porosity and from said epithermal slowing down time signal a second measurement signal representative of formation porosity; and means for combining said first and second porosity measurement signals according to a predetermined relationship to derive a correction factor signal indicative of the effect of tool standoff on said first porosity measurement signal.

11. Apparatus according to claim 10 wherein said porosity-measurement deriving means further comprises means for combining said correction factor signal with said first porosity measurement signal to derive said standoff-compensated porosity measurement signal.

12. Apparatus for investigating the porosity of a subsurface earth formation surrounding a borehole, comprising:
means for repetitively irradiating the well borehole and surrounding earth formation with bursts of high energy neutrons from a neutron source, which neutrons interact with nuclei of the materials in the borehole and formation to produce therein populations of epithermal neutrons;
means for measuring the magnitude of the epithermal neutron populations at least at two locations spaced at different distances along the borehole from the neutron source and generating respective count signals representative thereof;
means for measuring the decay of the epithermal neutron population between bursts at least a one location along the borehole and generating signals representative thereof;
means for deriving from said at least two epithermal neutron population count signals a first measurement of formation porosity as a function of the slowing down length of epithermal neutrons in the earth formation;
means for deriving from said epithermal neutron population decay signals a second measurement of formation porosity as a function of the slowing down time of epithermal neutrons in the earth formation; and
means for combining said first and second porosity measurements to derive a standoff-compensated measurement of formation porosity.

13. Apparatus according to claim 12 wherein said means for deriving said first porosity measurement comprises:
means for forming a ratio of said at least two epithermal neutron population count signals and deriving a signal representative thereof; and
means for converting said ratio signal according to a predetermined relationship to derive said first porosity measurement.

14. Apparatus according to claim 12 wherein said means for deriving said second porosity measurement comprises:
means for deriving from said epithermal neutron population decay signals a measurement of the epithermal neutron slowing down time of the earth formation and generating a signal representative thereof; and
means for converting said epithermal slowing down time measurement signal according to a predetermined relationship to derive said second porosity measurement.

15. Apparatus for investigating the porosity of a subsurface earth formation surrounding a borehole, comprising:
a sonde adapted to be moved through the borehole;
accelerator neutron source means in the sonde for repetitively irradiating the well borehole and surrounding earth formation with bursts of high energy neutrons, which neutrons interact with nuclei of the materials in the borehole and formation to produce therein populations of epithermal neutrons;
a first epithermal neutron detector in the sonde spaced from but close to said neutron source, without substantial intervening high density shielding;
first shielding means for shielding said first detector so as to increase the low energy neutron detection threshold thereof to at least approximately 10 eV;
a second epithermal neutron detector in the sonde located farther from said neutron source than said first detector, said second detector being eccentered towards one side of the sonde;
second shielding means for shielding said second detector from neutrons incident thereon from all sides thereof except said one side of the sonde;
a third epithermal neutron detector in the sonde located intermediate to said first and second detectors relative to said neutron source, said third detector being eccentered towards said one side of the sonde;
third shielding means for shielding said third detector from neutrons incident thereon from all sides thereof except said one side of the sonde;
means for eccentering the sonde in the borehole so that said one side of the sonde is closely adjacent to the borehole wall;
means for separately counting the neutrons detected by said first and second detectors over a time interval encompassing a plurality of said neutron bursts and for generating first and second count signals representative thereof;
means for deriving from said first and second count signals a first measurement correlatable with the porosity of said earth formation;
means for counting the neutrons detected by said third detector during a plurality of time intervals between successive neutron bursts and generating a corresponding plurality of count signals representative thereof;
means for deriving from said plurality of count signals a measurement of the epithermal neutron slowing down time of the earth formation as a second measurement correlatable with the porosity of said formation; and
means for combining said first and second porosity-correlatable measurements to provide an improved measurement of formation porosity.

16. The apparatus of claim 15 wherein said first measurement comprises a ratio of said first and second count signals.

17. The apparatus of claim 15 wherein:
said means for deriving said first porosity-correlatable measurement comprises means for deriving a first quantitative measurement of formation porosity; and
said means for deriving said second porosity-correlatable measurement comprises means for deriving a second quantitative measurement of formation porosity.

18. The apparatus of claim 17 wherein said combining means comprises means for combining said first and second quantitative measurements to derive an improved formation porosity measurement.

* * * * *

UNITED STATES PATENT AND TRADEMARK OFFICE
CERTIFICATE OF CORRECTION

PATENT NO. : 5,051,581

DATED : 9/24/91

INVENTOR(S) : Russell C. Hertzog, William A. Loomis, Peter Wraight

It is certified that error appears in the above-identified patent and that said Letters Patent is hereby corrected as shown below:

On the title page, under Inventors, add the following names after Peter Wraight, Missouri City, Tex.:

Arthur D. Liberman and Paul Albats, both of Ridgefield, Conn.

Signed and Sealed this

Twelfth Day of January, 1993

Attest:

DOUGLAS B. COMER

*Attesting Officer*   *Acting Commissioner of Patents and Trademarks*

UNITED STATES PATENT AND TRADEMARK OFFICE
CERTIFICATE OF CORRECTION

PATENT NO. : 5,051,581
DATED : September 24, 1991
INVENTOR(S) : Hertzog et al.

It is certified that error appears in the above-identified patent and that said Letters Patent is hereby corrected as shown below:

Col. 2, line 4, "4,023,323" should read --4,423,323--;
Col. 4, line 59, "borehold" should read --borehole--;
Col. 5, line 14, "pithermal" should read --epithermal--;
Col. 9, line 14, "inherently compensated" should read --compensated--;
Col. 11, line 24, "at least a" should read --at least at--.

Signed and Sealed this

Sixth Day of April, 1993

Attest:

STEPHEN G. KUNIN

*Attesting Officer*  *Acting Commissioner of Patents and Trademarks*